Figure 1:
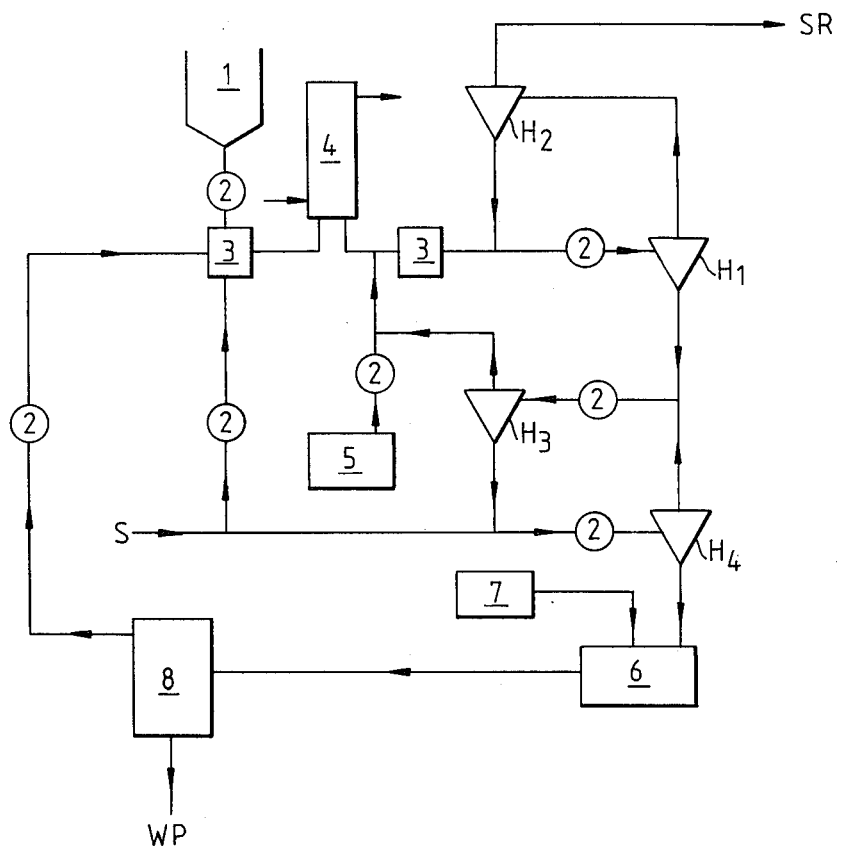

United States Patent [19]

Luijerink

[11] 4,446,066

[45] May 1, 1984

[54] PROCESS FOR THE MANUFACTURE OF GLOBIN OR BLOOD CELL PROTEIN AND HEME FROM HEMOGLOBIN

[75] Inventor: Jan H. Luijerink, Berghem, Netherlands

[73] Assignee: Internationale Octrooi Maatschappij "Octropa" B.V., Rotterdam, Netherlands

[21] Appl. No.: 388,665

[22] Filed: Jun. 15, 1982

[30] Foreign Application Priority Data

Jun. 15, 1981 [NL] Netherlands .......................... 8102856

[51] Int. Cl.³ ....................... A23J 1/06; C07C 103/52; C07G 7/00
[52] U.S. Cl. .......................... 260/112 B; 260/112.5 R; 424/101; 426/647; 426/657
[58] Field of Search ..................... 260/112 B, 112.5 R

[56] References Cited

U.S. PATENT DOCUMENTS

| | | | |
|---|---|---|---|
| 4,098,780 | 7/1978 | Lindroos | 260/112.5 R |
| 4,330,463 | 5/1982 | Luijerink | 260/112 B |
| 4,376,727 | 3/1983 | Sato et al. | 260/112 B |

FOREIGN PATENT DOCUMENTS 492555  7/1976  Australia .
502112  7/1979  Australia .

Primary Examiner—Howard E. Schain
Attorney, Agent, or Firm—Cushman, Darby & Cushman

[57] ABSTRACT

In a process of preparing blood cell protein and haem by splitting haemoglobin under the influence of an acid and an organic solvent, the haemoglobin is first contacted with methanol and water and/or ethanol under turbulent conditions at a temperature of 20° to 50° C., whereafter the mixture thus obtained is mixed under turbulent conditions with a mixture of organic solvent and acid, preferably hydrochloric acid. The separation of the dispersion obtained is carried out in hydrocyclones and the recuperated organic solvent is at least partly recycled into the process.

6 Claims, 2 Drawing Figures

PROCESS FOR THE MANUFACTURE OF GLOBIN OR BLOOD CELL PROTEIN AND HEME FROM HEMOGLOBIN

The present invention relates to a process of preparing blood cell protein and haem by splitting haemoglobin under the influence of an acid and an organic solvent, as well as to the blood cell protein and heam thus obtained, and to meats and meat products containing blood cell protein wholly or partly obtained by means of the process according to the present invention.

In Australian Patent Specification No. 492 555 (CSIRO) a process is disclosed for the preparation of a blood cell protein concentrate suitable for human consumption by plasmolysis or heamolysis of animal blood by means of an acidified organic solvent which is of low molecular weight and miscible with water. Hydrochloric acid, formic acid, acetic acid and tartaric acid are mentioned as usable acids, hydrochloric acid being preferred. The organic solvent may be acetone, methanol or ethanol, but acetone is preferred as this is said to have a strongly discolouring action and to be readily recuperable. The organic solvent is used in a weight ratio of solvent to blood of 6:1, and the organic solvent contains from 0.1 to 0.5% by weight of the acid. In this process the blood is preferably first foamed by means of a colloid mill, followed by mixing of the foamed blood with the acidified solvent.

An improvement on this process is proposed in Australian Patent Specification No. 502 112 (CSIRO) In this improved process the non-coagulated blood is injected under turbulent conditions into acidified acetone, during which the acetone, flowing far more slowly, transports the blood away from the point of injection. In this process the preferred starting material is a concentrate of red blood cells. It was found that the temperature at which the process is carried out is not critical, but that a constant temperature throughout the process is advantageous. The temperature applied may range from $-10°$ C. to $+35°$ C.

As contrasted with the disclosure in these two Australian patent specifications it has now been found that the organic solvent can by no means be chosen arbitrarily. When using the lower aliphatic ketones, such as acetone and methylethylketone, it was found that these solvents could not or only with great difficulty (and consequently not in an economically acceptable way) be removed from the blood cell protein ultimately obtained. Of the lower aliphatic alcohols only methanol appeared to have a strongly discolouring effect, and this solvent also withdraws water from the blood cells, which naturally is of benefit in the later drying process of the blood cell protein.

Once methanol or a mixture of methanol and water and/or ethanol had been chosen as the organic solvent, also a suitable acid had to be found. On legal and physiological grounds hydrochloric acid appeared to be the most suitable acid, but when a combination of hydrochloric acid and methanol or a mixture of methanol and water and/or ethanol was used for the separation of heamoglobin into heam and blood cell protein it appeared that mixing the acidified solvent with the heamoglobin resulted in the formation of a pappy mass which could not be processed for the further separation of the blood cell protein.

Extensive experiments have now shown that in the separation of haemoglobin the desired combination of hydrochloric acid and methanol or a mixture of methanol and water and/or ethanol can only be used in a practical (and economically justified) manner if the haemoglobin or a haemoglobin-containing concentrate of red blood cells is first contacted with non-acidified methanol or a mixture of methanol and water and/or ethanol with intensive stirring, thus under turbulent conditions, at increased temperature, and only thereafter is intimately mixed with acidified solvent. In the further separation of heam and blood cell protein the use of hydrocyclones has appeared to be particularly advantageous, resulting in a high separating efficiency and, in addition, allowing the use of corrosive acids in the hydrocylones which are made of synthetic materials. Besides, the organic solvent used is recycled as much as possible into the process.

The present process therefore provides a process of preparing haem and blood cell protein by splitting haemoglobin under the influence of an acid and an organic solvent, which is characterized in that (a) haemoglobin is contacted with an organic solvent under turbulent conditions at a temperature of $20°$ to $50°$ C., (b) to the mixture thus obtained is added under turbulent conditions a mixture of organic solvent and acid, (c) the dispersion obtained is separated by means of hydrocyclones into a phase rich in heam and a phase rich in blood cell protein, (d) the phase rich in blood cell protein is neutralized and the blood cell protein is separated from this phase, the haem is separated from the phase rich in haem, and the organic solvent obtained in these separations is at least partly recycled into the process.

The haemoglobin is obtained from blood (to which, optionally, an anti-coagulant such as sodium citrate may have been added) by separating it into blood plasma and a concentrate of red blood cells, for example by means of a solid bowl liquid/liquid separator such as, e.g., a Westfalia Separator Type BTA (Registered Trade Mark; 8300 x g). The blood plasma contains about 32% of the total blood protein content and can e.g. be used in meat products.

The red blood cell concentrate, which in practice normally still contains a small amount of blood plasma, is now contacted at increased temperature and under turbulent conditions with an organic solvent. This is done by mixing the red blood cell concentrate most vigorously with methanol or a mixture of methanol and water and/or ethanol as the organic solvent and preferably heating this mixture, with continuous vigorous stirring, to a temperature of $20°$ to $50°$ C. The mixture of organic solvent and red blood cell concentrate is preferably heated to a temperature of $20°$ to $40°$ C., particularly to a temperature of about $35°$ C. It has appeared that the temperature used is somewhat dependent of the volume ratio between the haemoglobin and the organic solvent. The more solvent is present in the mixture with haemoglobin, the lower is the temperature to which the mixture has to be heated.

After mixing and heating with the organic solvent, to the mixture thus obtained a mixture of organic solvent and an acid is added under turbulent conditions, for example by intensive stirring. Preferably, but not necessarily, the organic solvent is the same as the solvent used in the first step of the process. The hydrochloric acid can also be divided into the mixture in a gaseous form.

The acid used is preferably hydrochloric acid and the acid is used in such an amount that the pH of solvent and acid is at any rate below 4.5. In general such an amount of an acid is used that the organic solvent is 0.01 to 0.1 molar in acid.

The dispersion of organic solvent, acid and split haemoglobin thus obtained is now separated by means of hydrocyclones into a phase rich in haem and a phase rich in blood cell protein. The phase rich in blood cell protein is neutralized with a base, for example sodium hydroxide, and subsequently the blood cell protein is separated from this neutralized phase in a manner known per se. Likewise, the haem is separated in a manner known per se from the phase rich in haem. The organic solvent obtained in these two separations is at least partly recycled into the process.

The separation of the haemoglobin will be illustrated with reference to FIGS. 1 and 2.

In FIG. 1 the blood cell concentrate is fed from storage tank (1) to mixing apparatus (3) by means of dosing pump (2). To this mixing apparatus (3) also organic solvent (S) is fed by means of a dosing pump (2). In the mixing apparatus the red blood cell concentrate is mixed very intensively with the organic solvent. The intensively mixed mixture is now heated to a temperature of 25° C. to 50° C. in heat-exchanger (4), but, of course, the mixing apparatus can simultaneously be a heat-exchanger (not indicated in the Figure). The heated-up mixture is now intensively mixed in a second mixing apparatus (3) with a mixture of organic solvent and an acid from acid storage tank (5) fed by means of a dosing pump (2).

The acidified mixture, intensively mixed in the second mixing device (3), is now fed by means of pump (2) to hydrocyclone battery H1. The top product obtained from this battery is a phase rich in haem, which is fed to hydrocyclone battery H2. The top product of this hydrocyclone battery H2 is discharged to the solvent recuperation (SR), where the haem is separated and the organic solvent is recuperated.

The bottom product of the hydrocyclone battery H2 is combined with acidified mixture from the second mixing device (3) and fed to hydrocyclone battery H1. The bottom product of this hydrocyclone battery H1 is fed by means of a pump (2) to hydrocyclone battery H3. The top product of hydrocyclone battery H3 is mixed with the acid from storage tank (5) and fed to the second mixing device (3). The bottom product of hydrocyclone battery H3, consisting of a phase rich in blood cell protein, is mixed with pure organic solvent and fed by means of a pump (2) to the hydrocyclone battery H4. The top product rich in haem from hydrocyclone battery H4 is combined with the bottom product, rich in blood cell protein, of hydrocyclone battery H1 and this mixture is fed to hydrocyclone battery H3.

The washed-out phase rich in blood cell protein, leaving hydrocyclone battery H4 as bottom product, is neutralized with a base, for example sodium hydroxide, which is conveyed from the base storage tank by means of a pump (not shown) into the neutralizing apparatus (6), where the base is intensively mixed with the blood cell protein.

The blood cell protein concentrate thus neutralized is then separated from the solvent in a separator (8), which may e.g. consist of a centrifuge or a decantor (horizontal solid bowl centrifuge of the screw conveyor type, for example Westfalia Decanter, Type CA, 3200 x g; Registered Trade Mark). The solvent obtained from the separator (8) is returned to the process by means of a pump (2), the wet blood cell protein cake (WP) being dried, e.g. in a vacuum drier at a wall temperature of 40° C.

Figure 2:
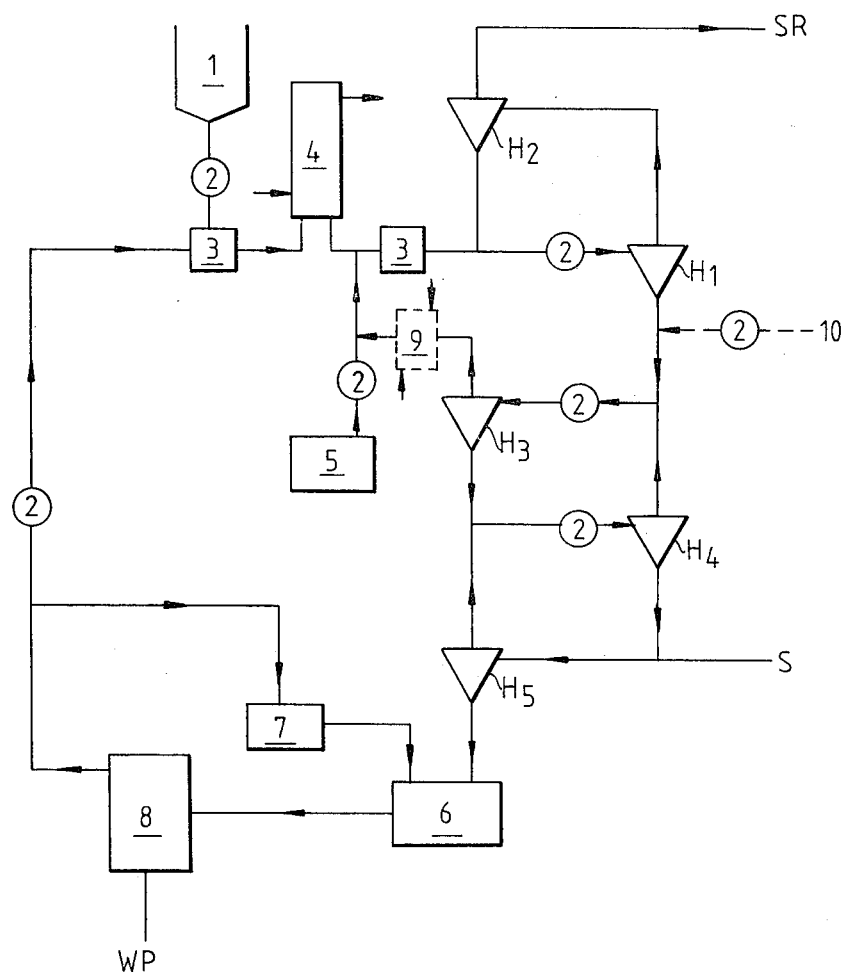

FIG. 2 shows a modification of the process. In this modification the red blood cell concentrate from storage tank (1) is fed, by means of pump (2) to mixing device (3), in which it is intensively mixed with organic solvent from separator (8). The intensively mixed mixture is now brought at a temperature between 20° and 50° C. in heat-exchanger (4). Also in this case the mixer may simultaneously be arranged as a heat-exchanger.

In a second mixing device (3) the heated-up mixture is intensively mixed with a mixture of organic solvent (from hydrocyclone battery H3) and an acid from acid storage tank (5) and fed by means of a dosing pump (2).

The mixture intensively mixed and acidified in this second mixing device is now fed by means of a pump (2) to the hydrocyclone battery H1. The top product obtained from this battery is a phase rich in haem, which is fed to a hydrocyclone battery H2. The top product of this hydrocyclone battery H2 is discharged to the solvent recuperation (SR), where the haem is separated and the organic solvent is recuperated.

The bottom product of the hydrocyclone battery H2 is combined with the acidified mixture from the second mixing device (3) and fed to the hydrocyclone battery H1. The bottom product of this hydrocyclone battery H1 is fed by means of a pump (2) to the hydrocyclone battery H3. Optionally, acid can be supplemented at (10) by means of a dosing pump (2).

The top product of the hydrocyclone battery H3 can, if desired, be heated up in a heat-exchanger (9) and be mixed with the acid from storage tank (5) and fed to the second mixing device (3). The bottom product of hydrocyclone battery H3 is now mixed with the top product of hydrocyclone battery H5 and fed, by means of pump (2), to hydrocyclone battery H4. The top product rich in haem of hydrocyclone battery H4 is combined with the bottom product rich in blood cell protein of the hydrocyclone battery H1 and this mixture is fed by means of pump (2) to hydrocyclone battery H3. The bottom product rich in blood cell protein of hydrocyclone battery H4 is mixed with pure organic solvent (S) and fed to hydrocyclone battery H5 by means of a pump (not shown). The bottom product of hydrocyclone battery H5 is neutralized with a base, e.g. sodium hydroxide, and mixed with organic solvent obtained from separator (8) in a neutralizing apparatus (6).

The neutralized blood cell protein concentrate is then separated from the solvent in a separator (8), which may e.g. consist of a centrifuge or a decanter (horizontal solid bowl centrifuge of the screw conveyor type, e.g. Westfalia Decanter Type CA, 3200 x g; Registered Trade Mark). The solvent obtained from the separator (8) is partly mixed with the base and for the rest recirculated into the process by means of pump (2), the wet blood cell protein cake (WP) being dried.

It will be understood that the process described above can be carried out both batchwise and continuously, a continuous process being preferred for economical reasons.

It is important that the mixing in both mixing devices (3) is done very intensively and, moreover, that the blood cell protein is removed from the reaction mixture as soon as possible after the splitting of the haemoglobin. Also the haem concentrate should be removed as much as possible from the blood cell protein concentrate before the neutralisation of this concentrate because, if the blood cell protein concentrate is neutralized in the presence of the haem, the latter substance binds itself again to the blood cell protein.

The hydroclones used have been described in detail, for example, in D. Bradley: The Hydrocyclone, Permagon Press, Oxford 1965, in particular Chapter 10 (pp. 200-211). Preferably, Nivoba cyclones are used, consisting of batteries of about 36 individual cyclones placed in concentric circles. In the book by Bradley referred to above this Nivoba type corresponds with the Dorrclone type hydrocyclones which consist of composite units comprising from 10 to 40 units.

The solvent preferably used in the process according to the present invention is methanol, or a mixture of methanol and water and/or ethanol. Although the solvent may be at ambient temperature, it is preferable, in connection with the heating step of the mixture of haemoglobin and organic solvent, to use heated solvent.

The precipitate of the blood cell protein can also be resolubilized in water, for example spray-dried, to give a powder of blood cell protein which is bland in odour and taste and can be used in meat products, in ingredients for foodstuffs, as emulsifier, e.g. as foaming agent, and the like.

The invention also relates to meats and meat products containing the blood cell protein, which has been obtained completely or partly by means of the process according to the present invention.

The invention also relates to medicinal iron-containing compositions, completely or partly consisting of the haem which has been obtained completely or partly by means of the process according to the present invention.

By means of the process of the present invention the iron content of the red blood cell concentrate, which is about 3000 to 4000 ppm, is reduced to an iron content of the ultimately obtained blood cell protein of about 350 ppm or less.

The invention will now be illustrated from the following Example, which should not however be construed in any way as limititative to the scope of protection of the present invention.

EXAMPLE

In the apparatus as shown in FIG. 1, in which all the hydrocyclone batteries were Nivoba hydrocyclones comprising 36 units, 4.05 kg red blood cells were intensively mixed with 30 liters methanol in a turbomixer (Ultra-Turrax; Registered Trade Mark). Subsequently this mixture was brought at 35° C. in a heat-exchanger. In a second turbomixer (Ultra-Turrax; Reg. Trade Mark) the heated mixture was intensively mixed with a mixture of 10.5 l methanol and 0.35 l 36% hydrochloric acid. The acidified mixture was fed, by means of a pump, to hydrocyclone battery H1, and the mixture was further processed as shown in FIG. 1. For the neutralisation 0.20 l 33% sodium hydroxide solution was used, a centrifuge being applied for the separation of the neutralized mixture. The wet cake of globin or blood cell protein thus obtained was dried in a vacuum drier with air of 40° C., resulting in ultimately obtaining 1.5 kg of a dry powder having an iron content of 250 parts per million.

I claim:

1. In a process of preparing blood cell protein and haem in which (a) haemoglobin is contacted with a mixture of organic solvent, selected from the group consisting of methanol and a mixture of methanol and ethanol and/or water, and hydrochloric acid under turbulent conditions and (b) the dispersion obtained is separated by means of hydrocyclones into a phase rich in haem and a phase rich in blood cell protein, (c) after which the phase rich in blood cell protein thus obtained is neutralized and the blood cell protein is separated from the neutralized phase and the haem is separated from the phase rich in haem, the improvement which comprises: contacting the haemoglobin, before step (a) is carried out, with a non-acidified organic solvent, selected from the group consisting of methanol and methanol and ethanol and/or water, under turbulent conditions at a temperature of from 20° C. to 50° C.

2. A process according to claim 1, in which the haemoglobin, before step (a) is carried out, is contacted with said non-acidified organic solvent at a temperature of from 20° C. to 40° C.

3. A process according to claim 1, in which the haemoglobin, before step (a) is carried out, is heated with the non-acidified organic solvent in a scraped-surface heat-exchanger.

4. A process according to claim 1, in which, in step (a), such an amount of hydrochloric acid is used that the organic solvent is 0.01 to 0.1 molar in acid.

5. A process according to claim 1, in which, in step (b), the blood cell protein is removed from the dispersion as soon as possible.

6. A process according to claim 1, in which the haem concentrate is removed from the blood cell protein concentrate before neutralization of the blood cell protein concentrate.

* * * * *